United States Patent
Fan et al.

(10) Patent No.: US 6,686,043 B1
(45) Date of Patent: *Feb. 3, 2004

(54) METHOD FOR MAKING LONG-LIFE ELECTROLUMINESCENT PHOSPHOR

(75) Inventors: Chen-Wen Fan, Sayre, PA (US); Richard G. W. Gingerich, Towanda, PA (US); Dale E. Benjamin, Athens, PA (US)

(73) Assignee: Osram Sylvania Inc., Danvers, MA (US)

( * ) Notice: Subject to any disclaimer, the term of this patent is extended or adjusted under 35 U.S.C. 154(b) by 330 days.

This patent is subject to a terminal disclaimer.

(21) Appl. No.: 09/690,222

(22) Filed: Oct. 17, 2000

Related U.S. Application Data

(63) Continuation of application No. 09/177,226, filed on Oct. 22, 1998, now abandoned.
(60) Provisional application No. 60/087,697, filed on Jun. 2, 1998.

(51) Int. Cl.$^7$ .................................................. B32B 5/16
(52) U.S. Cl. .................. 428/403; 428/404; 427/64; 427/68; 427/70; 427/213; 427/215; 427/255.23; 427/255.31; 427/255.34

(58) Field of Search ............................. 427/64, 68, 213, 427/215, 255.23, 255.31, 255.34, 70; 428/403, 404

(56) References Cited

U.S. PATENT DOCUMENTS

| | | | | |
|---|---|---|---|---|
| 4,585,673 A | * | 4/1986 | Sigai | 427/213 |
| 5,605,867 A | * | 2/1997 | Sato | 437/235 |
| 6,361,864 B1 | * | 3/2002 | Fan | 428/403 |

* cited by examiner

*Primary Examiner*—Leszek Kiliman
(74) *Attorney, Agent, or Firm*—William H. McNeill; Robert F. Clark

(57) ABSTRACT

A method of coating phosphor particles comprises introducing an inert gas into a reaction vessel and charging phosphor particles into the reaction vessel. The reaction vessel is then heated to a reaction temperature and a coating precursor is introduced while the temperature is maintained for a time sufficient to saturate the phosphor particles with the precursor. Thereafter, continuous precursor is introduced into the reaction vessel, along with an oxygen/ozone mixture. The inert gas flow, oxygen/ozone mixture flow and further precursor are supplied for a time sufficient to coat the phosphor particles.

8 Claims, No Drawings

METHOD FOR MAKING LONG-LIFE ELECTROLUMINESCENT PHOSPHOR

This application claims the benefit of Provisional Patent Application No. 60/087,697, filed Jun. 2, 1998.

This application is a continuation of Ser. No. 09/177,226, filed Oct. 22, 1998, now abandoned.

TECHNICAL FIELD

This invention relates to coated particles and more particularly to particles having a conformal coating thereon. More particularly, this invention relates to phosphors and still more particularly to electroluminescent phosphors having thereon a coating that protects the phosphor from moisture absorption and greatly increases the life and efficacy.

BACKGROUND ART

Coated phosphors are known from U.S. Pat. Nos. 4,585,673; 4,828,124; 5,080,928; 5,118,529; 5,156,885; 5,220,243; 5,244, 750; and 5,418,062. It is known from some of the just-mentioned patents that a coating precursor and oxygen can be used to apply a protective coating. See, for example, U.S. Pat. Nos. 5,244,750 and 4,585,673. The coating processes in several of the others of these patents employ chemical vapor deposition to apply a protective coating by hydrolysis. Additionally, U. S. patent application Ser. No. 03/153,978, filed Sep. 16, 1998, now abandoned and assigned to the assignee of the present invention, the teachings of which are hereby incorporated by reference, discloses a method for coating phosphor particles by chemical vapor deposition and using an oxygen/ozone reactant. The latter process operates in the absence of water or water vapor. It would be a further advance in the art to increase the efficacy and the life of such coated phosphors even more.

DISCLOSURE OF INVENTION

It is, therefore, an object of the invention to obviate the disadvantages of the prior art.

It is another object of the invention to enhance the operation of coated phosphors.

Yet another object of the invention is the provision of a phosphor coating method that does not employ water or water.

These objects are accomplished, in one aspect of the invention, by a method of coating phosphor particles by introducing an inert gas into a reaction vessel; charging phosphor particles into the reaction vessel to fluidize the same; heating the reaction vessel to a reaction temperature; introducing a precursor into said reactin vessel and maintaining the temperature for a time sufficient to saturate the phosphor particles with the precursor; introducing further precursor into the reaction vessel; introducing an oxygen/ozone mixture into the reaction vessel; and maintaining the inert gas flow, oxygen/ozone mixture flow and further precursor supply for a time sufficient to coat the phosphor particles.

The process yields lamps with lives in excess of 1000 hours with efficacies in excess of 5.3 lumens per watt (lm/watt) and 24 hour light output above 23 foot-lamberts.

BEST MODE FOR CARRYING OUT THE INVENTION

For a better understanding of the present invention, together with other and further objects, advantages and capabilities thereof, reference is made to the following disclosure and appended claims.

EXAMPLES

Three coating tests were conducted to study the effect of pre-treatment on lamp performance of coated EL phosphor. The phosphor in all instances was ZnS:Cu, a known electroluminescent material available as SYLVANIA Type 728, from Osram Sylvania Inc., Towanda, Pa. and 2.5 kg were charged into the reactor vessel for each of the experiments.

The fluidized bed reactor (the reaction vessel) was a 2 inch diameter quartz tube 36 inches high. Actual height of the reaction materials was about 18 inches and the reaction vessel included a vibromixer operated at 60 cycles per minute. Heating was by an external furnace. A thermocouple positioned in the middle of the powder bed was used to control the reactor temperature within ±3° C. The oxygen/ozone mix was prepared by passing oxygen at a flow rate of 4.6 liter per minute through an ozone generator to provide 5 to 7% ozone gas in the mixture. This gas mixture was flowed into the reaction vessel through a series of fine holes circumferentially located on the hollow shaft of the vibromixer, above the vibrating disc. The precursor in all instances was trimethyl aluminum (TMA) and the inert gas was nitrogen.

The first test (EL 236 B) was run as a control with the TMA and the oxygen/ozone mixture introduced into the reactor vessel at the same time to start the coating process, as taught in the above-mentioned pending application.

The second test (EL 234 B) used the oxygen/ozone mixture as a pre-treatment prior to the start of the coating process. After the reaction vessel reached a temperature of 180° C., a 6% ozone flowed into the reaction vessel at a flow rate of 4.6 liter per minute. The phosphor powders were first saturated oxygen/ozone for 30 minutes and then the TMA was introduced to initiate the coating run.

The third test (EL 235 B) added the precursor pre-treatment step. This step involved suspending the phosphor particles in a TMA/$N_2$ with a flow rate 2.5 liters per minute.

The surfaces of the phosphors were saturated with the TMA precursor at a temperature of 180° C. for 10 minutes prior to the introduction of the oxygen and ozone. After the pre-treatment step, all three coating runs were conducted under the same flow conditions at 180° C. for 48 hours. The coated phosphors were lamp tested in Mylar™. The results are shown in Table I.

| | | Lamp Performance | | | | | |
|---|---|---|---|---|---|---|---|
| | | Light Output (Ft.L) | | | | Life | Efficacy |
| Lot No. | % Al | 24 Hrs. | 100 Hrs. | 500 Hrs. | 1000 Hrs. | Hours | lm/watt |
| EL 236 B | 3.6 | 24.0 | 22.6 | 17.4 | 14.0 | 1,399 | 5.3 |
| EL 234 B | 3.6 | 24.9 | 23.5 | 18.0 | 14.5 | 1,396 | 5.5 |
| EL 235 B | 4.1 | 23.8 | 23.1 | 18.5 | 15.3 | 1,820 | 5.7 |

All of the samples performed very well in lamps, i.e., they had lives in excess of 1000 hours, efficacies in excess of 5.3 lm/watt and 24 hour light output above 23 foot-lamberts. From the test data in Table I it will be seen that pre-treating with oxygen/ozone had little effect on the performance in sample lamps. However, the sample that had been pre-treated with the precursor (EL 235 B) yielded a better performance in lamps, losing less light output at 1000 hours and having good efficacy and long life.

While there have been shown and described what are at present considered the preferred embodiments of the invention, it will be apparent to those skilled in the art that various changes and modifications can be made herein without departing from the scope of the invention as defined by the appended claims.

What is claimed is:

1. In a method of coating electroluminescent phosphor particles with a coating of aluminum oxide, the steps comprising: introducing an inert gas into a reaction vessel; charging phosphor particles into said reaction vessel; heating said reaction vessel to a reaction temperature of about 180° C.; introducing a coating precursor which includes at least aluminum into said reaction vessel for a time sufficient to saturate said phosphor particles with said precursor; continuing precursor flow into said reaction vessel; introducing an oxygen/ozone mixture into said reaction vessel to react with said precursor; and maintaining said inert gas flow, oxygen/ozone mixture flow and further precursor supply for a time sufficient to coat said electroluminescent phosphor particles with said aluminum oxide.

2. The method of claim 1 wherein said precursor is trimethylaluminum.

3. The method of claim 1 wherein said oxygen/ozone mixture comprises about 5 to 6 wt. % ozone.

4. The method of claim 1 wherein said inert gas is nitrogen.

5. The method of claim 1 wherein said time to saturation is about 10 minutes.

6. The method of claim 1 wherein said time sufficient to coat said phosphor is between about 40 to about 70 hours.

7. The method of claim 1 wherein said electroluminescent phosphor particles are charged into said reaction vessel with agitation.

8. The method of claim 7 wherein said agitation is maintained during said introduction of said oxygen/ozone mixture.

* * * * *